US008077566B2

(12) United States Patent
Mahnad

(10) Patent No.: US 8,077,566 B2
(45) Date of Patent: Dec. 13, 2011

(54) SYSTEMS AND METHODS FOR TESTING UNFORMATTED OPTICAL RECORDING MEDIA

(75) Inventor: Faramarz Mahnad, Brookline, MA (US)

(73) Assignee: Oracle International Corporation, Redwood City, CA (US)

(*) Notice: Subject to any disclaimer, the term of this patent is extended or adjusted under 35 U.S.C. 154(b) by 9 days.

(21) Appl. No.: 12/750,366

(22) Filed: Mar. 30, 2010

(65) Prior Publication Data

US 2011/0242953 A1 Oct. 6, 2011

(51) Int. Cl.
*G11B 20/10* (2006.01)
(52) U.S. Cl. .............. 369/47.14; 369/53.17; 714/701; 714/710
(58) Field of Classification Search .............. 369/53.11, 369/53.37, 53.45, 112.01, 112.23
See application file for complete search history.

(56) References Cited

U.S. PATENT DOCUMENTS

| | | | |
|---|---|---|---|
| 4,933,566 A | 6/1990 | Masaaki et al. | |
| 5,321,683 A | 6/1994 | Olczak | |
| 5,587,993 A | 12/1996 | Gregg | |
| 5,721,723 A | 2/1998 | Uchimaru et al. | |
| 5,828,644 A | 10/1998 | Gage et al. | |
| 5,886,789 A | 3/1999 | Koller et al. | |
| 6,167,011 A | 12/2000 | Sun et al. | |
| 6,449,230 B1 | 9/2002 | Seto | |
| 7,027,370 B2 | 4/2006 | Adachi et al. | |
| 7,088,662 B2 | 8/2006 | Shihara et al. | |
| 7,184,375 B1 | 2/2007 | Buchler et al. | |
| 7,212,474 B2 | 5/2007 | Van Helvoirt et al. | |
| 7,324,129 B2 | 1/2008 | Hanks | |
| 2005/0099935 A1 | 5/2005 | Iwanaga | |
| 2005/0162990 A1* | 7/2005 | Murata | 369/30.23 |
| 2007/0223327 A1 | 9/2007 | Nakane | |
| 2007/0223334 A1 | 9/2007 | Ko | |
| 2008/0013413 A1 | 1/2008 | Ishii et al. | |
| 2008/0056079 A1 | 3/2008 | Kim | |

FOREIGN PATENT DOCUMENTS

| | | | |
|---|---|---|---|
| JP | 11096668 | * | 9/1997 |
| JP | 11296868 A | * | 10/1999 |
| JP | 2000090551 A | * | 3/2000 |

* cited by examiner

*Primary Examiner* — Wayne Young
*Assistant Examiner* — Brenda Bernardi
(74) *Attorney, Agent, or Firm* — Marsh Fischmann & Breyfogle LLP; Jonathon A. Szumny; Kent A. Lembke

(57) ABSTRACT

Various embodiments herein include one or more of systems, methods, software, and/or data structures to test and evaluate unformatted optical media such as optical tape and optical discs. Advantageously, testing and evaluation can be performed earlier in the manufacturing process of the optical media to locate defects and/or other problems or issues with the optical media that can be addressed before additional manufacturing steps are performed and possible wasted. The systems and methods include at least two optical pickup units (OPUs), a first of which may be dedicated to writing digital data and the second of which may be dedicated to scanning, locating, tracking and/or reading the written data (when the optical media is moving in a first direction) in one of a plurality of manners. Information (e.g., optical signals such as sum, differential push pull and focus error signals) associated with the writing, scanning and retrieving of data at one or more locations or segments of the optical media may be used part of an analysis of one or more properties (e.g., signal to noise, signal jitter, thickness, roughness) of the optical media.

19 Claims, 7 Drawing Sheets

SYSTEMS AND METHODS FOR TESTING UNFORMATTED OPTICAL RECORDING MEDIA

BACKGROUND

1. Field of the Invention

The present invention generally relates to apparatuses (e.g., drives) for optical media such as optical tape and optical discs (e.g., Blu-ray Disc™, DVD), and more particularly to a testing and evaluation device that can write data to and read data from a piece of unformatted optical media.

2. Relevant Background

Optical media (e.g., optical tape, optical discs) are storage media that hold content in digital form and that are written and read by one or more lasers (e.g., embodied in optical pickup units or OPUs). Over time, optical media has become preferred to magnetic media (e.g., floppy disk) because of increased storage ability and durability. For instance, optical media may encode binary data in the form of "pits" (e.g., indentations, indicia), and "lands" (e.g., platforms, grooves) on one or more encoding or recording layers (e.g., each including a dye recording layer, a phase change material such as AgInSbTe, and/or a semi transparent metal reflecting layer). Pits result in a lack of or less (e.g., distorted) reflection when read by a laser and may equate to a binary value or zero "off," whereas lands reflect laser light and may equate to a binary value of one or "on". In some arrangements, pits may be disposed or located on the lands or grooves. For instance, a series of "2T" or "3T" patterns may be formed on the optical media.

Generally, the smaller the indicia are on the optical media, the higher the capacity is of the optical media. In any event, the one or more recording layers may be separated by transparent spacers and may be disposed or built up atop a thicker substrate (e.g., polycarbonate) which makes up the bulk of the disc and forms a dust defocusing layer. The other side of the optical disc usually has a printed label, generally made of paper but sometimes printed or stamped onto the disc itself. An optical disc is a flat, usually circular disc while optical tape generally consists of a long and narrow strip of plastic. Patterns and data can be written and read back from such discs and tapes.

In the case of optical discs, one or more continuous, spiral-shaped grooves may typically be formed in or over substantially an entire surface of the polycarbonate layer as part of the manufacturing process and before application of the recording layers, spacers, etc. Optical media having one or more of such grooves formed therein may be referred to as "preformatted" optical media (e.g., a preformatted optical disc). The groove can be defined by a series of sectors, each of which may be associated with particular addressing information that allow an OPU to access a particular track. As used herein, groove, lines and the like typically associated with preformatted optical media will be referred to as "data track location features". The above-discussed pits and lands (e.g., the encoding pattern) may be formed over or near the groove (e.g., with an OPU) from an innermost track to an outermost track to store data. Forming the pits and lands over the groove allows the data to be accessed by an OPU by way of accessing track addressing information. The data may then be accessed when the data path or pattern is illuminated with a laser diode in an optical disc drive which may spin the disc at speeds of about 200 RPM up to 4000 RPM or more depending on the drive type, disc format, and the distance of the read head from the center of the disc (inner tracks are read at a faster disc speed). In the case of optical tape, grooves and encoding may be associated with helical scan recording, quadruplex recording, or the like.

In any event, testing and evaluation is a vital aspect of the development and production of optical recording and storage media such as tape media, DVD, Blu-ray Disc™, or the like, especially as the size of the pits, lands and other indicia on the optical media decreases. Several methods can be used to assess the quality of optical media such as measuring its optical signals during a process of reading and/or retrieving data (e.g., sum signal, differential push pull tracking error signal, focus error signal), examining the integrity of its physical and logical formats, performing interchange testing, and conducting data verification on the like. For instance, optical signal data may be used to perform a jitter analysis and/or to measure thickness and/or roughness of the media to determine whether the various properties of the optical media are within established tolerances. Each method may be considered a piece of the quality testing puzzle.

Testing and evaluation is typically performed with preformatted optical media (i.e., including grooves stamped or otherwise formed into the media) and a testing device including a single OPU that can both read and write data. That is, after the OPU writes data along one or more grooves or lines of the optical media during the testing process, the same OPU (and/or a laser emanating from the OPU) must be able to return to the grooves or lines where the data was written. For instance, this may mean focusing a lens of the OPU (e.g., via a focusing actuator) or adjusting the entire OPU (e.g., via a sled mechanism). As the testing is performed using preformatted optical media, address information associated with the grooves or lines is accessed to locate and retrieve the written data.

SUMMARY

The use of preformatted optical media during testing and evaluation of optical media presents a number of disadvantages. First, the testing and evaluation cannot begin until the optical media has been preformatted because the single OPU needs track information (e.g., typically associated with lines and/or grooves) to locate data written. As a result, time may be lost and manufacturing steps may be wasted in the case of preformatted optical media that is determined to be defective through the testing and evaluation. Additionally, data must be written at one or more specific locations (e.g., at one or more portions or segments of a line or groove) which may limit or otherwise restrain where the OPU may write data during the testing and evaluation. A further disadvantage is that the preformatting may contaminate performance of the optical media during the testing and evaluation. Particularly, tolerances used in the testing and evaluation may be at the mercy of the preformatting process. Preformatting is also a costly process that can possibly be avoided if the testing and evaluation process determines that the optical media is defective or otherwise cannot be used.

Various embodiments herein include one or more of systems, methods, software, and/or data structures to test and evaluate unformatted optical media such as optical tape and optical discs. Advantageously, testing and evaluation can be performed earlier in the manufacturing process of the optical media to locate defects and/or other problems or issues with the optical media that can be addressed before additional manufacturing steps are performed and/or wasted. Additionally, data can be written during the testing process to almost any portion of the optical media (i.e., the data does not have to be written into or on a groove or line) and contamination of optical media performance by the preformatting may be limited or otherwise reduced, both of which may increase the efficiency and accuracy of the testing and evaluation process.

To this end, the inventor has discovered that unformatted optical media (e.g., without grooves or lines formed in the optical media) may be tested by way of using at least two OPUs, a first of which may write digital data and a second of which may scan, locate, track and/or read the written data (when the optical media is moving in a first direction) in one of a plurality of manners. When the optical media moves in a section direction, the second OPU may write data and the first OPU may scan, locate, track and/or read the written data. The first and second OPUs may be appropriately aligned (e.g., mechanically) such that each of the first and second OPUs is capable of scanning a section of the optical media that the other of the first and second OPUs writes data to. In any event, information associated with the writing, scanning, tracking and retrieving of data at one or more locations or segments of the optical media (e.g., optical signals such as sum, differential push pull and focus error signals) may be used part of an analysis of one or more properties (e.g., signal to noise, thickness, roughness) of the optical media.

According to a first aspect, a device for writing data to and reading data from an optical media component (e.g., optical disc, optical tape) is provided that includes a first optical pickup unit and a second optical pickup unit. Each of the first and second optical pickup units can emit laser beams that are focused by an object lens onto a surface of the optical media component. The first optical pickup writes data to the surface of the optical media component on a first path over a width of the surface and the second optical pickup unit emits optical beams onto the surface of the optical media component on a second path over substantially an entire portion of the width of the surface for use in scanning and tracking data written by the first optical pickup unit.

A second aspect includes a system for writing data to and reading data from an unformatted optical media component that is free of data track location features and that is movable in first and second opposing directions. The system includes a first optical pickup unit for emitting laser beams that are focused by an object lens onto a surface of the unformatted optical media component. The first optical pickup unit is moveable along a first path over the surface of the unformatted optical media component. The system also includes a second optical pickup unit, aligned with the first optical pickup unit, for emitting laser beams that are focused by an object lens onto the surface of the unformatted optical media component. The second optical pickup unit is moveable along a second path over the surface of the unformatted optical media component that is different than the first path. Each of the first and second paths is generally perpendicular to the first and second opposing directions of the unformatted optical media component.

According to a third aspect, a method for use with an optical media component includes writing, using a first optical pickup unit of an optical media testing device, data to a first segment of a surface of the optical media component on a first path as the optical media component moves in a first direction. The method also includes scanning, using a second optical pickup unit of the optical media testing device, the surface of the optical media component on a second path for the written data as the optical media component moves in the first direction.

Some variations of the above aspects contemplate that the second optical pickup unit may be operable to scan a second path that is generally arcuate (e.g., sinusoidal) and/or intersects the first path. For instance, the second optical pickup unit may be moved back in forth in a lateral direction (e.g., using a fine tracking actuator and/or sled mechanism) relative to a movement direction of the optical media component during a "scanning servo mode" in an effort to locate data written by the first optical pickup unit or otherwise locate the first path. This may result in a generally sinusoidal or other arcuate scanning path.

Once the data is located, the second optical pickup unit may invoke a "tracking servo mode" whereby the second optical pickup unit generates error signals that may be used by the testing device to substantially center the second OPU (and/or the second path) over the first path and/or the written data. This may include holding the second OPU substantially stationary such that it scans the second path in a substantially overlapping manner relative to the first path which allows the second optical pickup unit to read or otherwise retrieve the data. Information associated with retrieval of the data may be used as part of an evaluation and/or analysis of one or more properties of the optical media component. As can be appreciated, the devices, systems and methods disclosed herein may be utilized with unformatted optical media as data may be read or otherwise retrieved without the use of addressing information that is typically associated with pre-formatted optical media.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular (e.g., indicating that the device includes "the controller" alone does not mean that the device includes only a single controller). Moreover, any failure to use phrases such as "at least one" also does not limit the corresponding feature to the singular (e.g., indicating that a container includes "a sensor" alone does not mean that the container includes only a single sensor). Use of the phrase "at least generally," "at least partially," "substantially" or the like in relation to a particular feature encompasses the corresponding characteristic and insubstantial variations thereof. For example, a path that is "substantially sinusoidal" covers both an insubstantial variation of a sinusoidal path in addition to a path that is sinusoidal. Finally, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Various embodiments herein include one or more of systems, methods, software, and/or data structures to test and evaluate unformatted optical media such as optical discs and optical tape. Advantageously, testing and evaluation can be performed earlier in the manufacturing process of the optical media to locate defects and/or other problems or issues with the optical media that can be addressed before additional manufacturing steps are performed and/or wasted. Additionally, data can be written during the testing process to almost any portion of the optical media (i.e., the data does not have to be written into or on a groove and/or line) and contamination of optical media performance by the preformatting may be limited or otherwise reduced, both of which may increase the efficiency and accuracy of the testing and evaluation process. To this end, the inventor has discovered that unformatted optical media (e.g., without grooves and/or lines formed in the optical media) may be tested by way of using at least two OPUs, a first of which may be dedicated to writing digital data when the optical media is moving in a first of first and second opposing directions and the second of which may be dedicated to locating and reading the written data in one of a plurality of manners.

Figure 1:
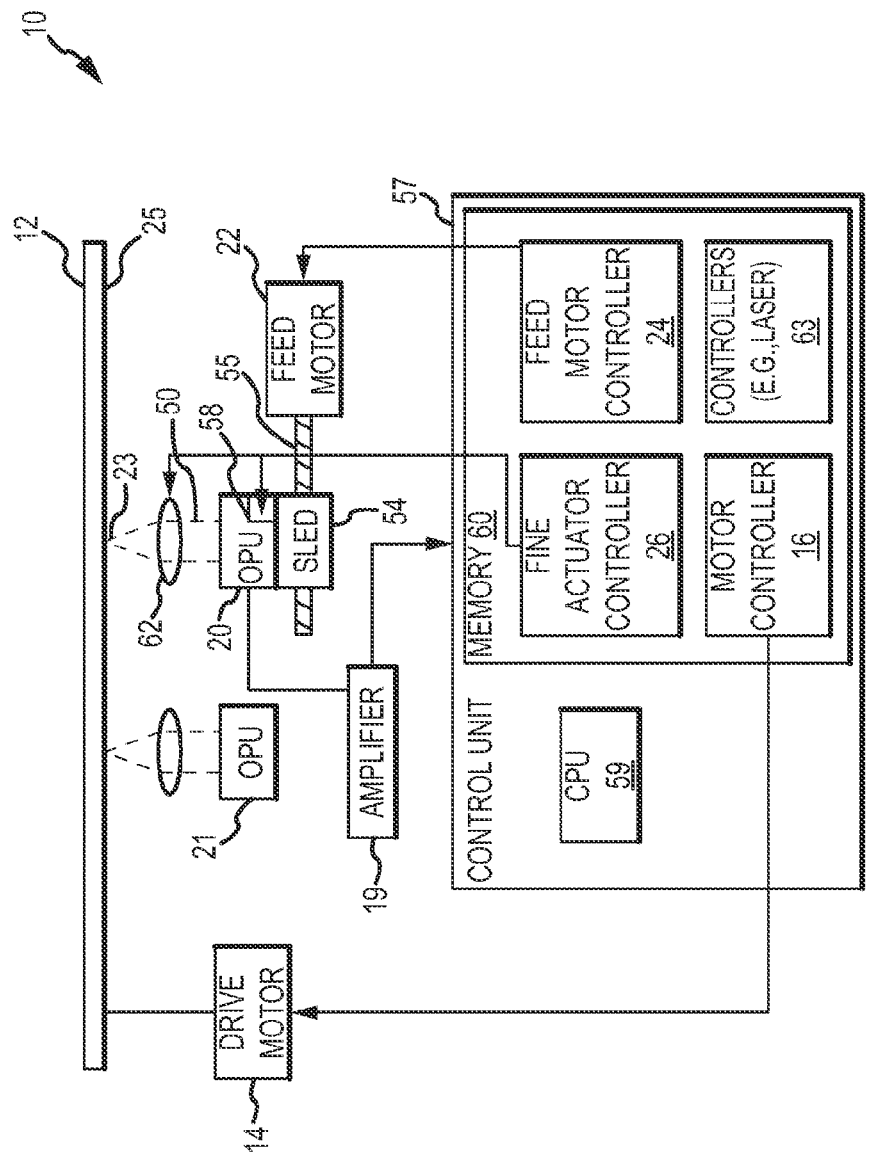
FIG. 1 is a schematic view of an optical media testing device that is testing optical media according to one embodiment.

FIG. 1 illustrates a schematic or block diagram view of an optical media testing system or device 10 that is operable to test optical media 12 (i.e., an optical media component) according to one embodiment. As will be discussed in greater detail below, the optical media testing device 10 may write or record data to the optical media 12 and then read such written data as part of testing and evaluation of the optical media 12. The optical media or optical media component 12 may be any appropriate form of storage medium such as optical tape, optical discs such as CD, CD-R, DVD, DVD-R, DVD+R, Blu-ray Disc™ (BD), BD-R, BD-RE, UMD, or the like. In this regard, the optical media testing device 10 may be compatible with optical media of various formats. Moreover, the optical media 12 usable with the device 10 may be in unformatted form other otherwise may not be preformatted. In some arrangements, this may mean that the optical media 12 does not include grooves, lines or the like that allow written data to be associated with such grooves or lines and thereby be located via tracking and/or addressing information.

The device 10 may include a drive motor 14 operable to move the optical media 12 in any appropriate direction. For instance, a central opening of an optical disc may be mounted on a spindle and the drive motor 14 may be operable to rotate the spindle and thus the optical disc in either of first and second opposite directions at any appropriate velocity to allow the device 10 to write and/or read data. In the case of optical tape, the optical tape may be contained within a cartridge or paquette, and the tape may be wound around or move about a plurality of reels. A spindle interconnected to the drive motor 14 may be inserted into one of the reels or at another location in the cartridge to move the tape in first and second opposite longitudinal directions at any appropriate velocity. Alternatively, the optical tape may be used with the device 10 without being contained or disposed within a cartridge or paquette. The system and componentry used to move the optical tape may be referred to as a "tape transport system".

With continued reference to FIG. 1, the device 10 may also include first and second optical pickup units (OPUs) 20, 21. Depending upon an operating direction of the optical media 12 (e.g., one of first and second opposite directions), the primary function of one of the first and second OPUs 20, 21 may be to write or record data onto the optical media 12 and that of the other of the first and second OPUs 20, 21 may be to read data from the optical media 12 written by the one of the first and second OPUs 20, 21. For instance, the first and second OPUs 20, 21 may respectively function to write and read data when the optical media 12 moves in a first direction and may, in contrast, respectively function to read and write data when the optical media 12 moves in a second (typically opposite) direction.

Those of ordinary skill in the art will appreciate that either of the first and second OPUs 20, 21 could perform writing and reading operations by way of adjusting a power level of the light or radiation beam emanating from the first and second OPUs, 20, 21. That is, in writing data on the optical media 12, the power of the light beam may be modulated between a relatively high level, at which the reflectivity of recording film of the optical media 12 may be changeable to create indicia (e.g., pits, lands, and the like) on the optical media 12, and a relatively low level, at which the reflectivity of the recording film may not be changeable. In reading data from the optical media 12 on the other hand, the power of the light beam may be decreased and a readout signal may be generated by detecting a variation in the reflectance of the recording film of the optical media 12 via one or more photodiodes (not shown). Accordingly, during a reading operation, the light beam power may be adjusted to, and maintained at, a sufficiently low constant level. While operation and control of the first OPU 20 will be discussed below, it will be appreciated that similar features and discussion applies to the second OPU 21 (even though not specifically illustrated) unless otherwise specified. Moreover, while first and second OPUs 20, 21 will be discussed, it should be appreciated that additional OPUs (each of which can read and/or write data) can be included with the device 10 to expand the testing and evaluation capabilities of the device 10.

The first OPU 20 may include an optical system of a known type for generating a radiation or laser beam 50 guided through optical elements focused to a radiation spot or area 23 on an information or recording layer (e.g., including a dye recording layer and/or a semi transparent metal reflecting layer) of the optical media 12. Typically, the radiation beam projects through a bottom surface 25 of the optical media 12 and may be generated by a radiation source (e.g., laser diode). As noted above, the first OPU 20 may write data by directing the laser beam 50 onto the information or recording layer of the optical media 12. Additionally, the first OPU 20 may also include one or more detectors (e.g., photodetectors, photodiodes) which may receive light reflected from the optical media 12 and may produce readout signals indicative of data written on the optical media 12 as well as servo signals (e.g., error signals) which may be used as part of scanning, tracking, focusing, etc.

The first OPU 20 may further include any number of well known servos and/or actuators for moving the first OPU 20 and/or a laser beam emanating from the first OPU 20. For instance, the first OPU 20 may be mounted upon any appropriate sled mechanism 54 (e.g., box, bracket) that rides along a threaded shaft 55 which is driven by a feed motor 22 to change a lateral position of the first OPU 20 relative to the optical media 12, or otherwise translate the first OPU 20 in a side to side manner over the optical media 12. The sled mechanism 54 may serve to adjust or position the first OPU 20 on a large portion of a width of the optical media 12.

The first OPU 20 may also include a "fine adjustment arrangement" which may serve numerous purposes. For instance, the fine adjustment arrangement may include a tracking actuator 58 which may serve to change a lateral position of the first OPU 20 relative to the optical media 12, but to a much lesser extent than that provided by the servo sled. For instance, once the feed motor 22, sled mechanism 58 and shaft 55 have roughly positioned the first OPU 20 at a desired location (e.g., radial) over the optical media 12, the tracking actuator 58 may more finely position the first OPU 20. The fine adjustment arrangement may also include a focusing actuator 62 for adjusting the focus of the radiation beam along the optical axis of the radiation beam. For instance, each of the focusing and tracking actuators 58, 62 may be of a moving coil type in which magnets are fixed. The fine adjustment arrangement may also be operable to tilt one or more lenses associated with the first OPU 20 so as to adjust the angle at which the radiation or laser beam hits the optical media 12. While the first OPU 20 has been represented by box 20 which contains one or more laser diodes and/or other componentry, it should be appreciated that the tracking actuator 58, focusing actuator 62, etc. may also be considered part of the first OPU 20.

The device 10 may also include a collection of servo and control circuitry which may command the device 10 to perform desired operations. For instance, the device 10 may include a control unit 57 which may be implemented as a printed circuit board employing a combination of various components such as a processor 59 for processing computer/processor-executable instructions that are stored in a memory 60. Resident within the memory may be a fine actuator controller 26 which may be operable to control the tracking and focusing actuators 58, 62, a feed motor controller 24 which may be operable to control operation of the feed motor and hence movement of the sled mechanism 54 and first OPU 20 along the shaft 55, and a motor controller 16 operable to control the drive motor (e.g., to move the optical media 12 in one of first and second opposite directions). The memory may also include a collection of other controllers 63 operable to control operation of other components of the device 10 such as the laser diode and other componentry. An amplifier 29 may receive signals from detectors associated with the first OPU 20 and perform the necessary operations before passing the signals to the control unit 57. One or more components of the device 10 may be contained within any appropriate housing or housings (not shown).

Turning now to FIGS. 2a-2d, partial schematic views illustrate optical media 12 in the form of optical tape 100 in use with an optical media testing device (such as device 10 of FIG. 1). Initially, it will be appreciated that the reading OPU (e.g., the second OPU 21) may be located or situated "downstream" from the writing OPU (e.g., the first OPU 20) in an operating direction of travel of the optical tape 100. That is, once a segment or portion of the optical tape 100 has passed by the writing OPU, that same segment or portion may thereafter pass by the reading OPU.

Additionally, the first and second OPUs 20, 21 may be appropriately aligned such that each of the first and second OPUs 20, 21 is capable of scanning and thereafter tracking and reading all sections or portions of the optical tape 100 (e.g., a particular width of the optical tape 100) that the other of the first and second OPUs 20, 21 can write or record to. In one arrangement, the first and second OPUs 20, 21 may be in the form of a "dual OPU fixture" and be mounted on the same sled mechanism (e.g., sled mechanism 54). For instance, the first and second OPUs 20, 21 may be contained within a common housing (which may be contained within a housing of the device 10. However, each may also include its own "fine adjustment arrangement" (see above discussion). In this regard, movement of the writing OPU via the sled mechanism to a particular portion of the optical tape 100 may also automatically move the reading OPU to the same general location. Thereafter, the fine adjustment arrangement of the reading OPU may work in conjunction with, for instance, control unit 57 to scan and thereafter read data written by the writing OPU as will be discussed in more detail below.

In another arrangement, the first and second OPUs 20, 21 may be mounted on separate sled mechanisms that may be at least substantially parallel to, close to, and/or aligned with each other (e.g., the first ends of the first and second sled mechanisms are aligned and the second ends of the first and second sled mechanisms are aligned). In this regard, the sled mechanisms can position the first and second OPUs 20, 21 at all or close to all positions that the other of the first and second OPUs 20, 21 can be positioned at. In one variation, the first and second OPUs 20, 21 may be mounted on separate sled mechanisms and be mechanically linked via one or more pieces of hardware such that movement of one of the first and second OPUs 20, 21 via a sled mechanism automatically moves the other of the first and second OPUs 20, 21 via its respective sled mechanism. Again, however, each of the first and second OPUs 20, 21 may be independently moved via its respective fine adjustment arrangement.

It should be noted that each of the first and second OPUs 20, 21 may be held stationary (e.g., may be non-movable) relative to a moving direction of the optical tape 100. That is, while the first and second OPUs 20, 21 (or laser beams emanating therefrom) may be moved or focused within a specific dynamic range along a y axis (e.g., lateral or side to side relative to the optical tape 100) and a z axis (e.g., up and down or towards and away from the optical tape 100), they may not be movable along an x axis (e.g., along or parallel to a movement direction of the optical tape 100). In any event, what is important is that the reading OPU can scan and/or read all or substantially all data that has been previously written by the writing OPU. Stated otherwise, the reading OPU can scan and/or read data on the entire width or lateral segment of the optical tape 100 that the writing OPU can write data to. Optical signals associated with scanning and reading of data can be appropriately processed by, for instance, amplifier 19, control unit 57, etc. as discussed above to test and evaluate various aspects of the optical tape 100. In this regard, a testing device (e.g., device 10) need not depend upon tracking information (e.g., associated with lines and/or grooves on preformatted optical media) to locate data on the optical tape 100.

The optical tape 100 may be mounted on first and second reels 102, 104 which may be appropriately interconnected to a tape transport system controlled by any appropriate drive motor (e.g., drive motor 14 in FIG. 1), motor controller, etc. to move the optical tape 100 in first and second opposite (longitudinal) directions 106, 108 (e.g., along the x axis) at any appropriate speed. Additionally, the first and second OPUs 20, 21 may be respectively movable along paths 114, 116 (e.g., along the y axis) relative to the optical tape 100 (e.g., via sleds mechanisms and/or fine adjustment arrangements) to allow the first and second OPUs 20, 21 to project light beams onto different portions or segments of the optical tape 100. For instance, the paths 114, 116 may be substantially perpendicular and/or lateral relative to the first and second movement directions 106, 108 of the optical tape 100. For clarity, other features of the device 10 have been removed in FIGS. 2a-2d although it should be appreciated that the above discussion of the device 10 is equally applicable to FIGS. 2a-2d. Additionally, while FIGS. 2a-2d illustrate laser beams being projected onto and/or through a first surface 103 of the optical tape (e.g., an outer layer or surface), this discussion could be equally applicable to a second, opposite surface 105 of the optical tape 100.

Figure 2A:
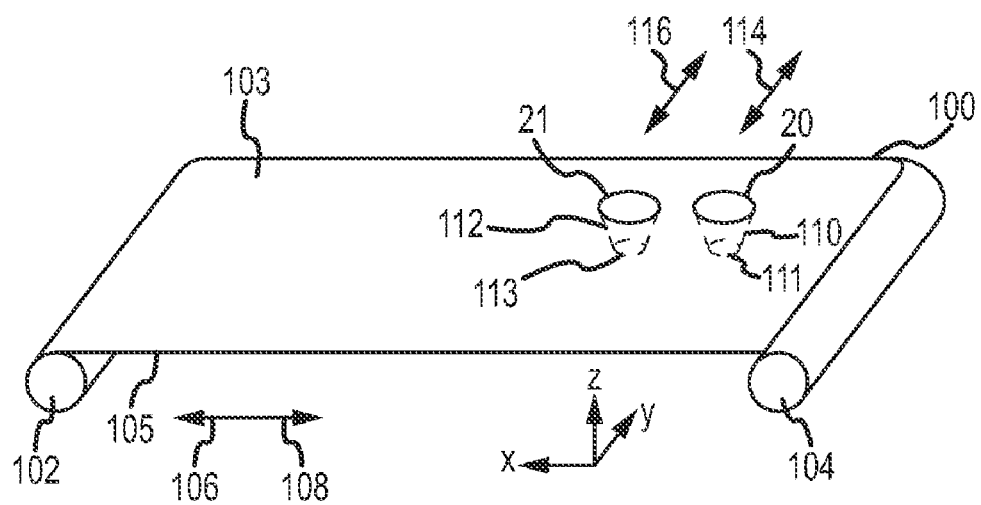
FIG. 2a is a partial schematic view of a first surface of the optical media and first and second OPUs of FIG. 1 before data has been written to the optical media, and the optical media is in the form of optical tape.

With reference to FIG. 2a, the first and second OPUs 20, 21 may be operable to project respective first and second light (e.g., laser) beams 110, 112 through the first surface 103 and eventually onto areas (e.g., points, swaths) 111, 113 on the recording layer(s) of the optical tape 100. While it may appear in FIGS. 2a-2d that the areas 111, 113 are disposed on the first surface 103 of the optical tape 100, the areas 111, 113 may in reality be disposed on the recording layer(s) (see previous discussion) of the optical tape 100 which is not shown for clarity.

Figure 2B:
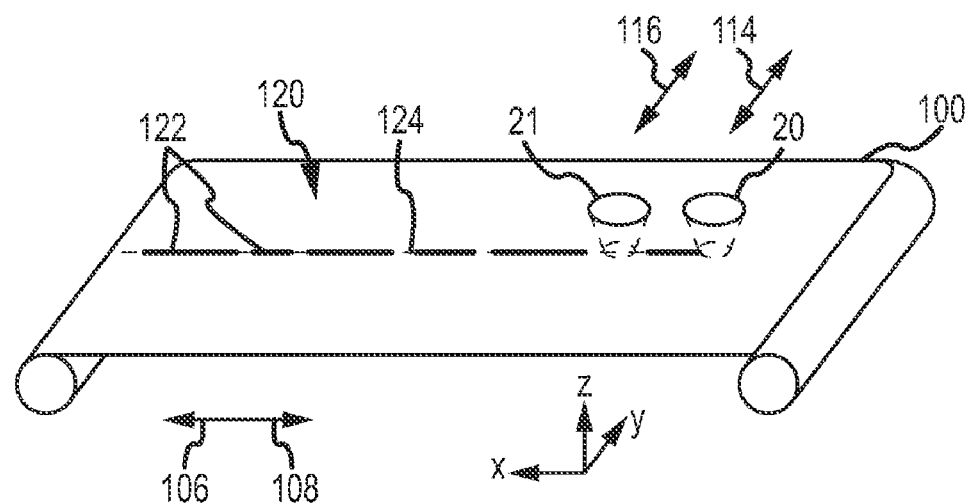
FIG. 2b is a partial schematic view similar to FIG. 2a but after the first OPU has written data to the optical media.

FIG. 2b presents the optical tape 100 after the first OPU 20 has written data 120 to the optical tape 100 with the optical tape 100 moving in the first direction 106 at, for instance, a constant velocity. As discussed earlier, the data 120 may be in the form of indicia 122 (e.g., pits, lands, and the like) and may be formed when the light beam 110 has altered one or more properties of the recording layer such that the indicia alter the direction and/or quantity of light reflected from the optical tape 100 and received by one or more detectors. As can be seen, the written data 120 may be generally disposed or situated along a first path 124 that may generally follow and/or be parallel to the first direction 106 of the optical tape 100 (e.g., may follow the x axis or a longitudinal direction of the optical tape 100). This may result from the first OPU 20 being held stationary (e.g., by the sled mechanism and/or fine adjustment arrangement) while the first OPU 20 is in a writing mode. However, the first path 124 may follow directions other than following the first direction 106 of the optical disc 100 (e.g., such as would result from the first OPU 20 being moved along the path 114).

Figure 2C:
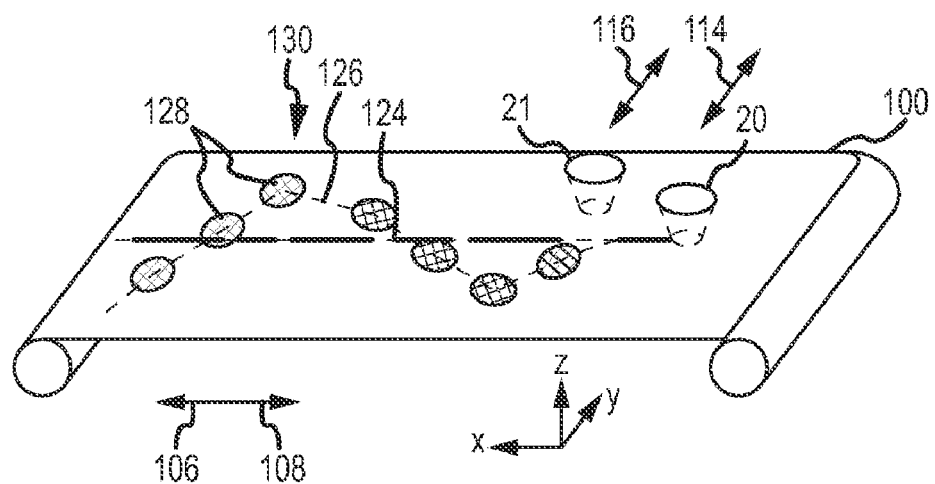
FIG. 2c is a partial schematic view similar to FIG. 2b but after the first OPU has written data to the optical media and the second OPU has begun scanning for the written data but not yet located the written data.

FIG. 2c presents the optical tape 100 after first OPU 20 has written data 120 along the first path 124 and the second OPU 21 has begun projecting light and detecting reflected light via one or more detectors from the surface (e.g., recording surface) of the optical tape 100 along a second path 126 in an effort to detect the written data 120. Initially, the second OPU 21 may operate in a "scanning servo mode" to locate the written data 120, and this may be represented by a first course or portion 130 of the second path 126. As illustrated, the second OPU 21 has scanned a series of scan areas 128 along the surface of the optical tape 100 although it will be appreciated that the second OPU 21 could scan more or fewer scan areas, or even a single continuous scanning area or swath to form the second path 126.

As noted earlier, the first and second OPUs 20, 21 are mounted and/or arranged within the testing device (e.g., device 10) such that each can scan and/or read all portions of the optical tape 100 that the other can write to. Here, the second OPU 21 may be moved along path 116 (e.g., via modulation of the tracking actuator of the fine adjustment arrangement) in an attempt to locate the written data 120 during scanning servo mode. This may result in the second path 126 being curvilinear (e.g., sinusoidal) in nature due to the optical tape 100 moving during the scanning servo mode of the second OPU 21.

For instance, sum signals associated with the strength of any written data may be generated by one or more detectors of the second OPU 21 and thereafter processed by, for instance, amplifier 19 and used by control unit 57 to determine if the written data 120 has been found. The generation and processing of sum signals in the scanning servo mode may be part of an open loop system whereby error signals generated by detectors of the second OPU 21 are not used to locate the written data 120. Once the sum signals are determined (e.g., via the control unit 57) to be of a sufficient strength that indicates that the written data 120 has seen located, the second OPU 21 may transition or move into a "tracking servo mode" of operation whereby the second OPU 21 begins tracking and reading or retrieving the written data 120. In some arrangements, the second OPU 21 may move into tracking servo mode upon the second path 126 crossing or intersecting the first path 124 only a single time. In other arrangements, the second path 126 may cross or intersect the first path 124 multiple times before the second OPU 21 transitions into tracking servo mode of operation.

Figure 2D:
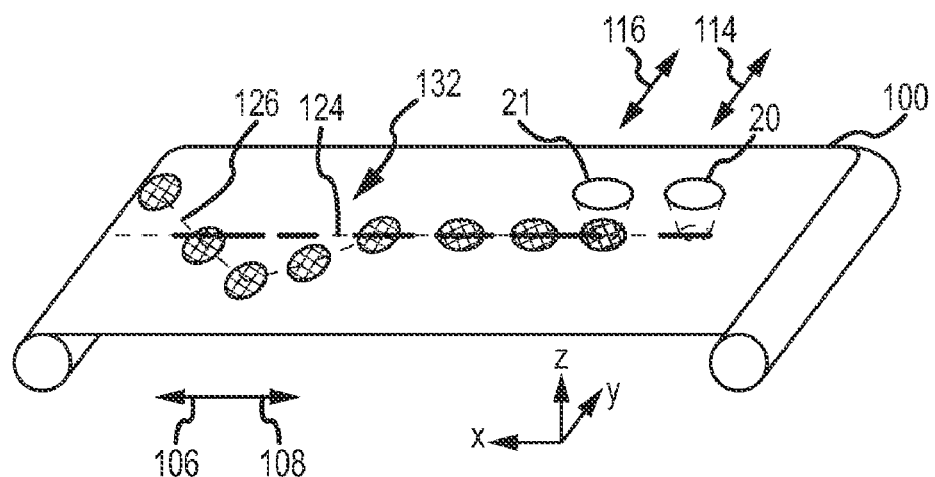
FIG. 2d is a partial schematic view similar to FIG. 2c but after the first OPU has written data to the optical media and the second OPU has located and begun reading the written data.
Figure 3A:
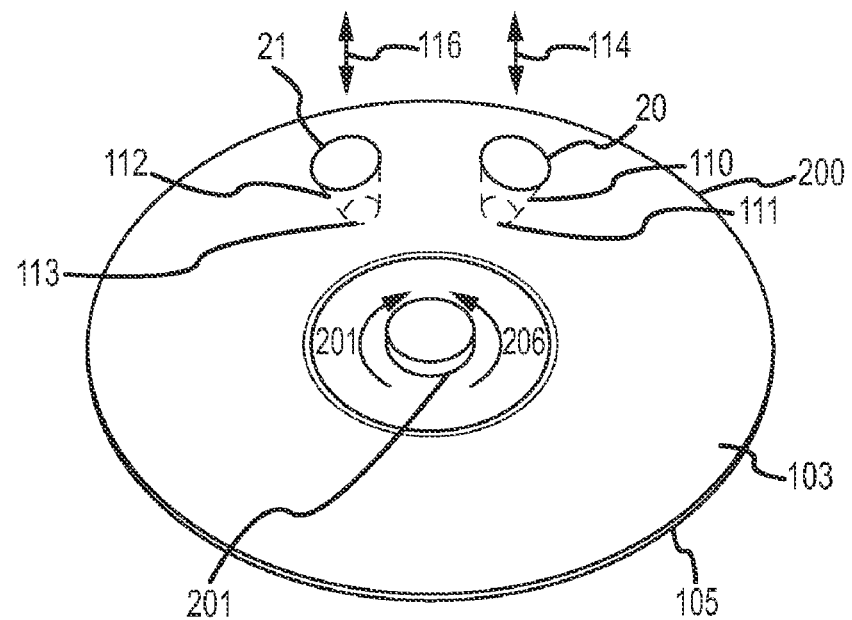
FIG. 3a is a partial schematic view of a first surface of the optical media and first and second OPUs of FIG. 1 before data has been written to the optical media, and the optical media is in the form of an optical disc.
Figure 3B:
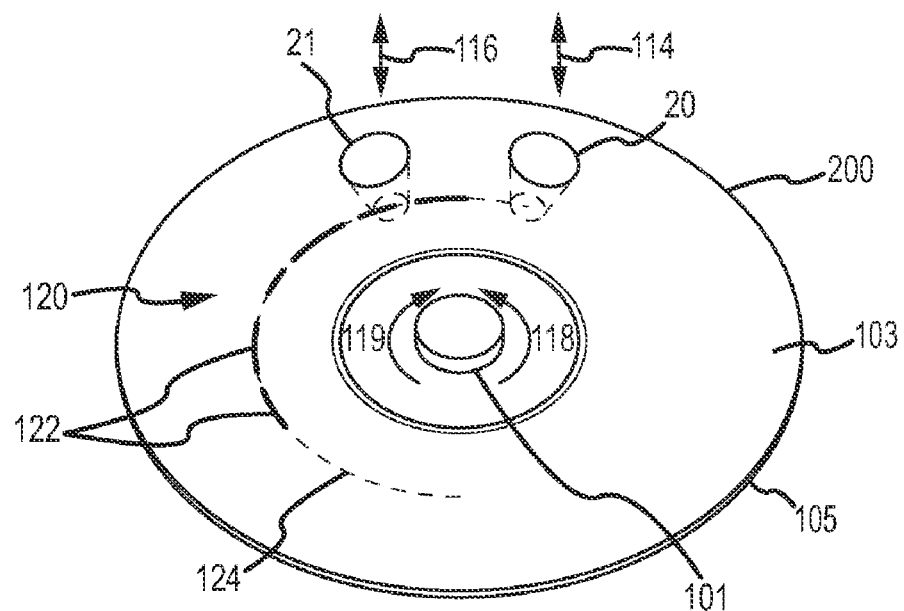
FIG. 3b is a partial schematic view similar to FIG. 3a but after the first OPU has written data to the optical media.
Figure 3C:
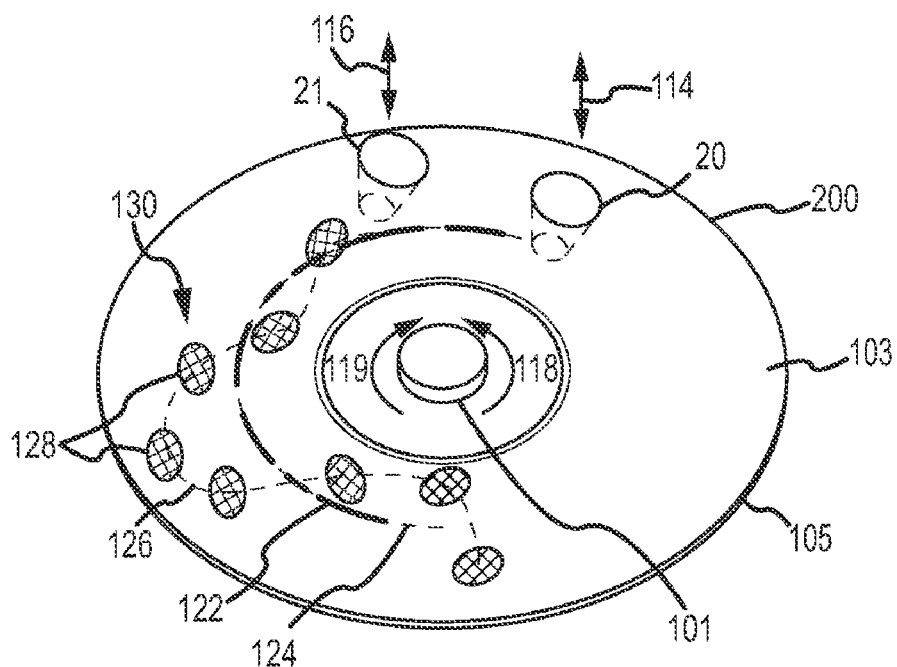
FIG. 3c is a partial schematic view similar to FIG. 3b but after the first OPU has written data to the optical media and the second OPU has begun scanning for the written data but not yet located the written data.
Figure 3D:
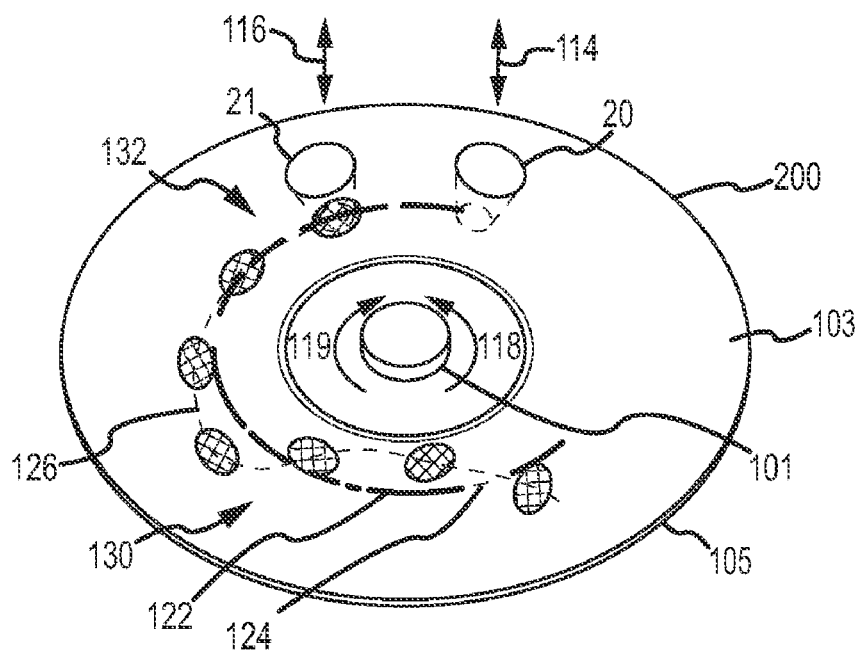
FIG. 3d is a partial schematic view similar to FIG. 3c but after the first OPU has written data to the optical media and the second OPU has located the written data.

Turning now to FIG. 2d, the second OPU 21 is illustrated in the tracking servo mode and this may be represented by a second different course or portion 132 of the second path 126. For instance, a distance from a trough to a crest of the first portion 130 may become smaller in the second portion 132. As shown, the second portion 132 eventually converges so as to overlap the first path 124, and this may be part of a closed loop system. More specifically, error signals generated by the one or more detectors of the second OPU 21 may be appropriately processed by the testing device to eventually allow the second path 126 to converge on and at least substantially overlap the written data 120 of the first path 124 so as to read and retrieve the written data 120. As can be appreciated, this may involve use of the above-discussed actuators, servos, controllers, etc.

For instance, the actuators may be driven on the basis of error signals thereby forming a closed servo loop. For example, at least one of differential push-pull (DPP) and differential phase detection (DPD) tracking may be used as part of the tracking servo mode of the second OPU 21 and may be implemented in the form of any appropriate logic resident within the memory 60 of the control unit 57. As discussed earlier, information and signals (e.g., sum, error) associated with the process of reading the written data 120 may be used as part of any appropriate evaluation of one or more properties or qualities of the optical tape 100.

It is notable that the second OPU 21 is following the written data 120 as opposed to any grooves or lines that would be found on preformatted optical media. In some variations, the second path 126 need not proceed in a curvilinear or arcuate manner or may proceed in only a slight curvilinear manner when, for instance, the second OPU 21 begins scanning the second path on or adjacent the first path 124. In this case, the second OPU 21 may essentially proceed to the tracking servo mode almost immediately after the scanning servo mode or otherwise after a period of time sufficient for the testing device (e.g., the control unit 57 via any appropriate logic) to determine that the strength of generated and processed sum signals are sufficient to indicate that the written data 120 has been located.

Turning now to FIGS. 3*a*-3*d*, partial schematic views illustrate the optical media 12 in the form of an optical disc 200 in use with an optical media testing device (such as device 10 of FIG. 1). The optical disc 200 may be mounted on a spindle 201 that may be appropriately interconnected to a drive motor (e.g., drive motor 14 of FIG. 1) to move the optical disc 200 in first and second opposite (rotational) directions 118, 119 at any appropriate speed. As much of the above discussion in relation to FIGS. 2*a*-2*d* (e.g., writing, scanning, tracking) applies equally to FIGS. 3*a*-3*d*, no further discussion will be provided.

Many other manners of use of the device 10 in conjunction with the optical tape and disc 100, 200 are contemplated. In one variation, other portions or segments of the surface of the optical tape and disc 100, 200 may be evaluated. For instance, the first OPU 20 may be appropriately moved (e.g., via the sled mechanism and/or fine adjustment arrangements) along path 114 to a different segment (e.g., an outer or peripheral portion) of the surface of the optical tape and disc 100, 200 and then held stationary. As part of or before this step, the optical tape and disc 100, 200 may be rewound (e.g., moved in the second movement direction 108, 208). Thereafter, the first OPU 20 may proceed to write new data to the surface of the optical tape and disc 100, 200 at the different segment with the optical tape and disc 100, 200 again moving in the first movement direction 106, 206, and then the second OPU 21 may go through the scanning and tracking servo modes to locate and retrieve the new written data.

In another variation, the movement direction of the optical tape and disc 100, 200 may be reversed (so as to move in the second movement direction 108, 208) as well as the function of the first and second OPUs 20, 21. That is, and upon the optical tape and disc 100, 200 moving in the second movement direction 108, 208, the second OPU 21 may engage in writing data to the surface of the optical tape and disc 100, 200 and the first OPU 20 may engage in scanning and retrieving data from the surface as described previously. One or more of the above functions of the device 10 may be engaged in in any appropriate manner and any appropriate number of times as part of an overall data collection process that may be used as part of an analysis of one or more properties of the optical media (e.g., optical disc, optical tape).

Of course, the device 10 should not be construed as being limited to only first and second OPUs. Additional OPUs may be incorporated with the device 10 as appropriate. For instance, third and fourth OPUs may be operable to write, scan and read data on other segments of the optical media. Additionally, while the device 10 has been illustrated in relation to unformatted optical media, it is also contemplated that preformatted optical media could be used with the device 10. Other arrangements are also contemplated.

Figure 4:
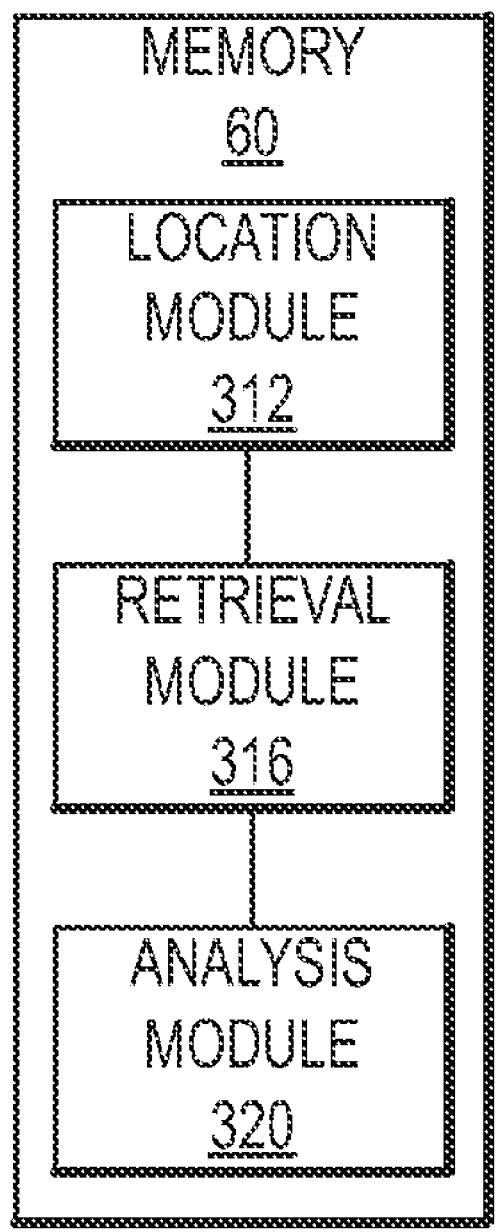
FIG. 4 is a schematic view illustrating a memory of the system including a number of modules that may be used to perform one or more functions of the first and second OPUs.

Turning now to FIG. 4, the memory 60 of FIG. 1 is illustrated including a number of modules that may be implemented to perform the scanning, tracking, and analysis discussed herein. The other components of the memory 60 shown in FIG. 1 have been removed for clarity. For example, the memory 60 may include a location module 312 including logic or software appropriate to perform (e.g., to cause the various components of the device 10 to perform) the writing of data by the writing OPU and/or the scanning servo mode of the reading OPU to locate the written data. The memory 308 may also include a retrieval module 316 including logic appropriate to perform the tracking servo mode of the reading OPU and read or retrieve the written data and/or signals (e.g., sum, error) associated with such reading or retrieval. The memory 308 may also include an analysis (e.g., data evaluation) module 320 that may be operable to perform one or more appropriate analyses of the data and signals obtained by the retrieval module 316 as part of an analysis of one or more properties of the optical media 12. Other appropriate modules may also be included (e.g., a writing module).

Figure 5:
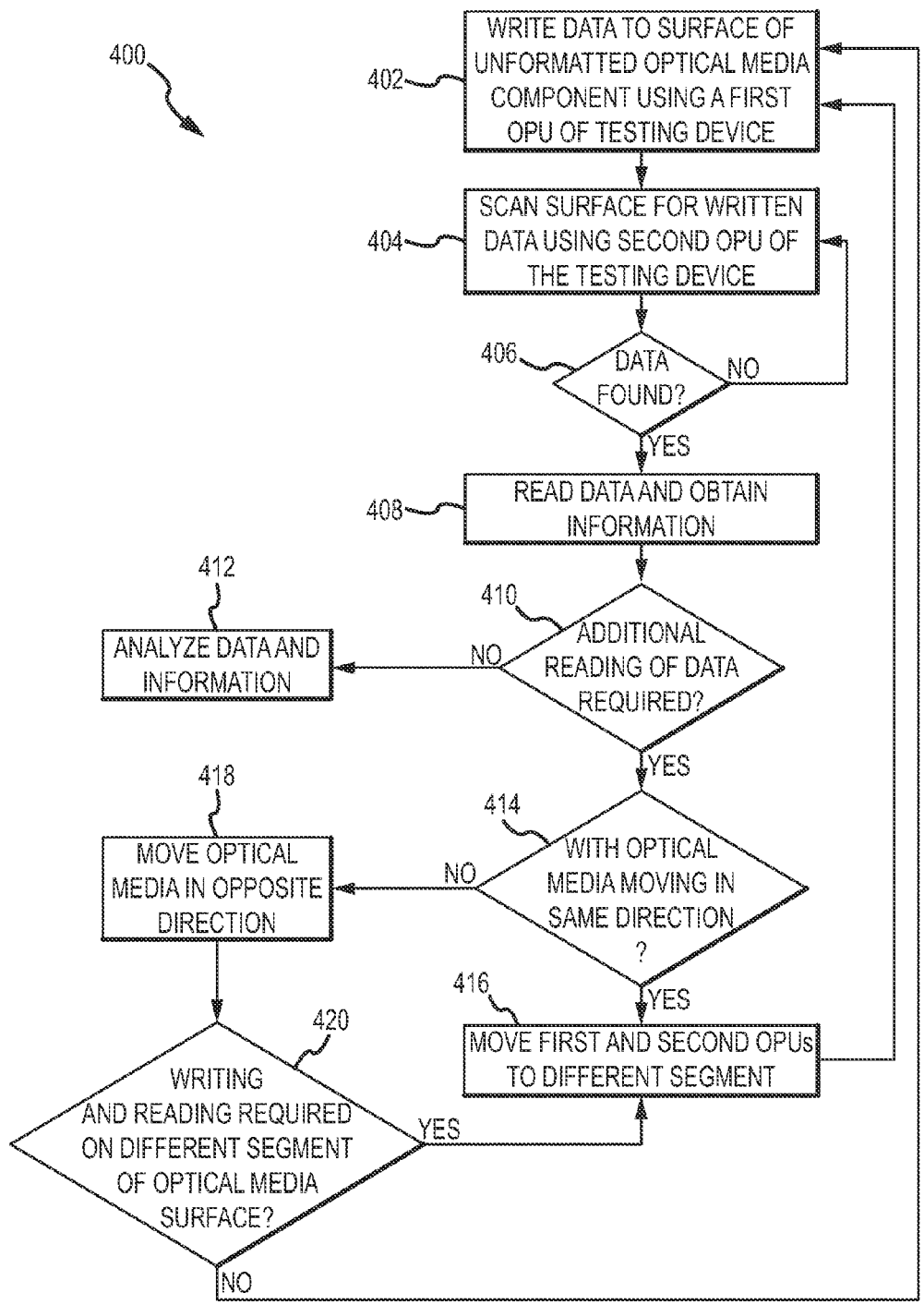
FIG. 5 is a flow diagram illustrating one method of use of the device of any of FIGS. 1-3d.

FIG. 5 is a flowchart illustrating one protocol or method 400 of use of the device 10, although the device 10 may be used as part of other methods as well. As will be appreciated, the method 400 advantageously allows testing and evaluation of optical media (e.g., optical disc, optical tape) which may limit manufacturing steps, lower costs, etc. (e.g., in the case of unformatted optical media). One step 402 may be to write data to the surface of a piece of unformatted optical media along a first path using a first OPU of a testing device with the optical media moving in a first direction. For instance, a laser diode of the first OPU may emit a laser at a particular wavelength and frequency to alter the properties of a dye recording layer to form pits, land and/or other indicia in the recording layer of the unformatted optical media.

Thereafter, step 404 may include scanning the surface (e.g., recording layer) of the optical media (e.g., along a second path) for data written by the first OPU using a second OPU of the testing device. As discussed earlier, this may be referred to as "scanning servo mode of operation of the second OPU and may include scanning a curvilinear path (e.g., sinusoidal) over the surface of the optical media until sum signals processed by the device 10 indicate the written data has been sufficiently located. The scanning may include scanning the second path until it intersects the first path one or more times.

Step 406 then may query whether data was found in step 404. If data was not found, then the method 400 may go back to step 404 to continue scanning for data. However, if data is found, then the method 400 may proceed to step 408 whereby the second OPU may proceed to a "tracking servo mode" which allows the second OPU to home in or converge on the written data and allow the written data to be read or otherwise retrieved (e.g., by emitting light and detecting light reflection via one or more photodetectors). For instance, this may include, after the second path has intersected the first path one or more times, converging the second path on the first path such that the second path substantially overlaps or is collinear with the first path. The tracking servo mode may use DPP or DPD methods of tracking which may be implemented in the form of any appropriate logic associated with the device 10. Thereafter, the method 400 may query at step 410 whether there is additional writing of data required in relation to the piece of optical media. In response to a negative answer, the method 400 may proceed to step 412 whereby the retrieved data and any associated information (e.g., optical signals such as sum, differential push pull and focus error signals) may be used as part of an analysis of one or more properties (e.g., signal to noise, thickness, roughness) of the optical media.

In response to an affirmative answer to step 410, the method 400 may proceed to step 414 whereby it is asked whether the additional writing and/or reading is with the optical media moving in the first direction. If the answer is yes, then step 416 specifies that the first and second OPUs may be moved to a second segment or location on the unformatted optical media (e.g., via sled mechanisms or fine adjustment arrangements) and then the method 400 may return to step 402 whereby data may again be written to the surface of the optical media (along another path). However, if the answer is no, then the optical media may be moved in an opposite second direction in step 418 (e.g., via reversing direction of the drive motor 14 in FIG. 1) and then it may be queried in step 420 whether writing and/or reading is required on a different segment or portion of the surface of the optical media (e.g., on a different lateral segment along the width of the optical media).

If the answer is yes, then the method 400 may proceed to step 416 whereby the first and second OPUs may be moved to the second segment and then data may be written along another path in step 402. Otherwise, the method 400 may proceed back to step 402 to write data to the surface of the optical media component which may thereafter been detected and retrieved for use in an analysis of the optical media.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A device for writing data to and reading data from an optical media component, the device comprising:
    a first optical pickup unit for emitting laser beams that are focused by an object lens onto a surface of the optical media component, wherein the first optical pickup unit writes data to the surface of the optical media component on a first path over a width of the surface; and
    a second optical pickup unit for emitting laser beams that are focused by an object lens onto the surface of the optical media component wherein the second optical pickup unit emits laser beams onto the surface of the optical media component on a second path for use in scanning and tracking data written by the first optical pickup unit, wherein the second path comprises a first segment and following a first course and a second segment created after the first segment and following a second course, wherein the first course is different than the second course, wherein the first segment is associated with a scanning mode of the second optical pickup unit and the second segment is associated with a tracking mode of the second optical pickup unit, and wherein the tracking mode occurs after the scanning mode has located data written by the first optical pickup unit.

2. The device of claim 1, wherein the second segment substantially overlaps the first path.

3. The device of claim 1, wherein the first segment of the second path is substantially arcuate.

4. The device of claim 3, wherein the first segment is substantially sinusoidal.

5. The device of claim 3, wherein the first segment intersects the first path a plurality of times.

6. A device for writing data to and reading data from an optical media component, the device comprising:
    a first optical pickup unit for emitting laser beams that are focused by an object lens onto a surface of the optical media component, wherein the first optical pickup unit writes data to the surface of the optical media component on a first path over a width of the surface; and
    a second optical pickup unit for emitting laser beams that are focused by an object lens onto the surface of the optical media component, wherein the second optical pickup unit emits laser beams onto the surface of the optical media component on a second path over substantially an entire portion of the width of the surface for use in scanning and tracking data written by the first optical pickup unit, wherein the first optical pickup unit is mechanically linked to the second optical pickup unit, wherein movement of one of the first and second optical pickup units moves the other of the first and second optical pickup units.

7. A device for writing data to and reading data from an optical media component, the device comprising:
    a first optical pickup unit for emitting laser beams that are focused by an object lens onto a surface of the optical media component, wherein the first optical pickup unit writes data to the surface of the optical media component on a first path over a width of the surface; and
    a second optical pickup unit for emitting laser beams that are focused by an object lens onto the surface of the optical media component, wherein the second optical pickup unit emits laser beams onto the surface of the optical media component on a second path over substantially an entire portion of the width of the surface for use in scanning and tracking data written by the first optical pickup unit, further comprising an analysis module that analyzes signals associated with retrieval of data by the second optical pickup unit.

8. A system for writing data to and reading data from an unformatted optical media component that is free of data track location features, the unformatted optical media component being movable in first and second opposing directions, the system comprising:
    a first optical pickup unit for emitting laser beams that are focused by an object lens onto a surface of the unformatted optical media component, wherein the first optical pickup unit is moveable along a first path over the surface of the unformatted optical media component; and
    a second optical pickup unit, aligned with the first optical pickup unit, for emitting laser beams that are focused by an object lens onto the surface of the unformatted optical media component, wherein the second optical pickup unit is moveable along a second path over the surface of the unformatted optical media component that is different than the first path, wherein each of the first and second paths is generally perpendicular to the first and second opposing directions of the unformatted optical media component.

9. The system of claim 8, wherein the first optical pickup unit is mechanically linked to the second optical pickup unit, wherein movement of one of the first and second optical pickup units moves the other of the first and second optical pickup units.

10. The system of claim 8, further comprising a sled mechanism that moves at least one of the first and second optical pickup units along the first and second paths.

11. The system of claim 10, further comprising:
a first tracking actuator that moves the first optical pickup unit along the first path; and
a second tracking actuator that moves the second optical pickup unit along the second path, independent from the first tracking actuator.

12. A method for use with an optical media component, the method comprising:
writing, using a first optical pickup unit of an optical media testing device, data to a first segment of a surface of the optical media component on a first path as the optical media component moves in a first direction; and
scanning, using a second optical pickup unit of the optical media testing device, the surface of the optical media component on a second path for the written data as the optical media component moves in the first direction, wherein the scanning step comprises:
processing sum signals generated by at least one detector of the second optical pickup unit to determine if the written data has been found.

13. A method for use with an optical media component, the method comprising:
writing, using a first optical pickup unit of an optical media testing device, data to a first segment of a surface of the optical media component on a first path as the optical media component moves in a first direction; and
scanning, using a second optical pickup unit of the optical media testing device, the surface of the optical media component on a second path for the written data as the optical media component moves in the first direction, wherein the optical media component is free of data track location features.

14. The method of claim 13, wherein the writing step comprises:
emitting a laser beam onto the first segment of the surface of the optical media component such that the first path is generally parallel to the first direction.

15. The method of claim 13, wherein the scanning step comprises:
moving the second optical pickup unit laterally relative to the first direction of movement of the optical media component.

16. The method of claim 13, wherein the second path follows a first course during the scanning step, wherein the method further comprises, in response to data associated with the first path being located during the scanning step:
continuing to scan, using the second optical pickup unit, the surface of the optical media component on the second path following a second course different than the first course.

17. The method of claim 13, further comprising, in response to data associated with the first path being located during the scanning step:
tracking the data along the first path using the second optical pickup unit such that the second path substantially overlaps the first path.

18. The method of claim 17, wherein the tracking step comprises:
using at least one of differential push-pull and differential phase detection tracking.

19. The method of claim 17, further comprising after the tracking step:
using information gathered during the tracking step to evaluate one or more properties of the optical media component.

* * * * *

UNITED STATES PATENT AND TRADEMARK OFFICE
CERTIFICATE OF CORRECTION

PATENT NO.        : 8,077,566 B2                                       Page 1 of 1
APPLICATION NO.   : 12/750366
DATED             : December 13, 2011
INVENTOR(S)       : Mahnad It is certified that error appears in the above-identified patent and that said Letters Patent is hereby corrected as shown below:

In column 11, line 42, delete "in in" and insert -- in --, therefor.

In column 13, line 57, in Claim 1, delete "component" and insert -- component, --, therefor.

In column 13, line 62, in Claim 1, delete "segment and" and insert -- segment --, therefor.

In column 14, line 12, in Claim 5, delete "a" and insert -- of a --, therefor.

Signed and Sealed this
Thirteenth Day of March, 2012

David J. Kappos
*Director of the United States Patent and Trademark Office*